Feb. 9, 1965   P. BOSAK   3,168,983
BIRTHDAY CAKE CANDLE EXTINGUISHER
Filed May 23, 1963   2 Sheets-Sheet 1
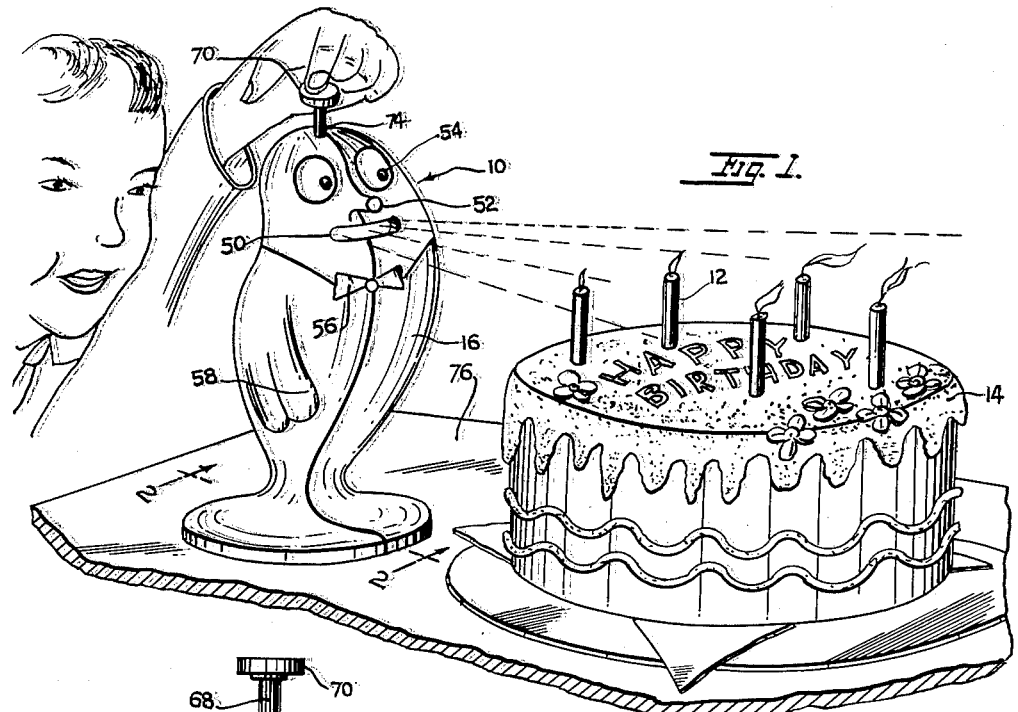
Fig. 1.
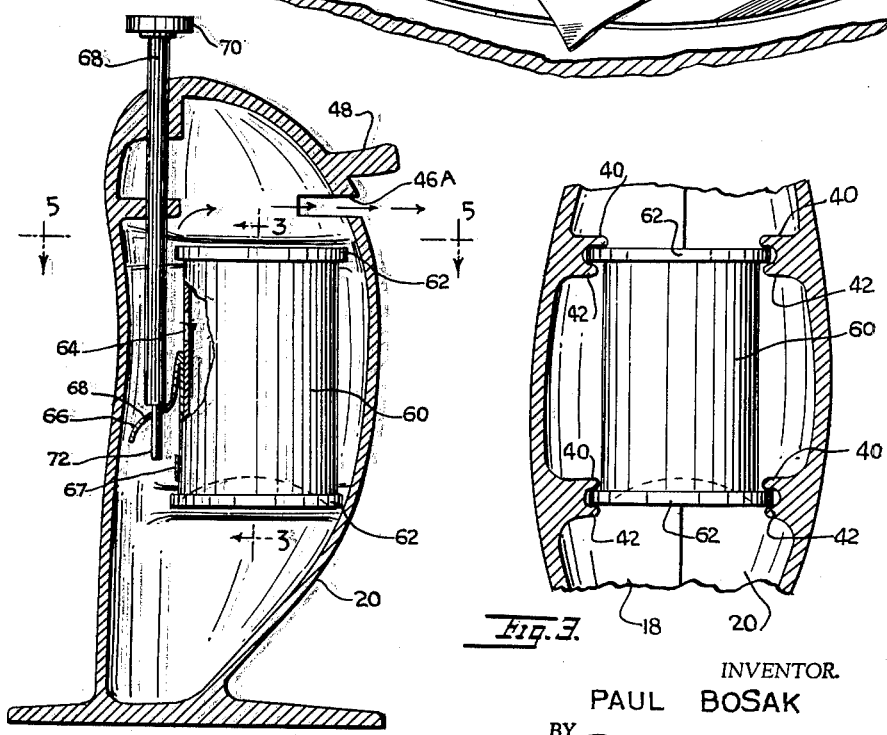
Fig. 2.
Fig. 3.
INVENTOR.
PAUL BOSAK
BY Polachek & Saulsbury
ATTORNEYS.

Feb. 9, 1965 P. BOSAK 3,168,983
BIRTHDAY CAKE CANDLE EXTINGUISHER
Filed May 23, 1963 2 Sheets-Sheet 2

INVENTOR.
PAUL BOSAK
BY Polachek & Saulsbury
ATTORNEYS.

United States Patent Office 3,168,983
Patented Feb. 9, 1965

3,168,983
BIRTHDAY CAKE CANDLE EXTINGUISHER
Paul Bosak, New York, N.Y. (Rte. 1, Etna Green, Ind.)
Filed May 23, 1963, Ser. No. 282,709
7 Claims. (Cl. 239—211)

This invention relates to candle extinguishers and more particularly to a candle extinguisher for extinguishing lighted candles on birthday cakes and the like.

Broadly, the invention comprises an elongated hollow sectional body with a base on one end for supporting the body on a supporting surface. The other end of the body is rounded and formed with a protuberance and a slot underneath simultating a nose and mouth of a human being. Marks simulating human eyes are placed on both sides of the nose. A supply of compressed air is supported inside the body in a fracturable can. A plunger in the form of a rod for fracturing the can extends outwardly of the body and is adapted to be slid inwardly for fracturing the can. The mouth slot serves as a discharge outlet for the air when the can is fractured and the body may be readily placed near a birthday cake with candles thereon with its mouth slot in line with the lights on the top of the candles. By movement of the plunger downwardly a blast of air will extinguish all of the lights in line with the mouth of the body.

The body can be made in a decorative form simulating an animal, doll, toy soldiers, cannon or other toy figure or figurine. The air released from the fractured can passes out of the mouth of the body with considerable force to extinguish the lighted candles. The device is a useful and amusing party table decoration. It serves the useful function of extinguishing candles mechanically. This device fulfills a long-felt need at birthday parties for small children who may have insufficiently forceful breath to extinguish candles on a cake. The device avoids the fire hazard commonly encountered when small children approach too close to lighted candles in an attempt to blow them out. The device also avoids the unsanitary condition encountered when children inexpertly blow on candles and inadvertently expectorate upon the cake carrying the candles.

The device is so simple and economical to manufacture that the device may be discarded after a single use.

It is therefore one object of the invention to provide a device useful for extinguishing candles on a birthday or holiday cake.

A further object is to provide a candle extinguisher in which a body contains a can of compressed air, with manually operable means for fracturing the can to release the air through an opening in the body.

Another object of the invention is to provide a candle extinguisher wherein the body is in the form of a figurine or toy figure.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a front perspective view of a candle extinguisher embodying my invention in position to blow out the candles on a birthday cake.

FIG. 2 is a vertical sectional view taken on the line 2—2 of FIG. 1, on an enlarged scale, parts being broken away.

FIG. 3 is a vertical sectional view taken on the line 3—3 of FIG. 2, parts being omitted.

Figure 4:
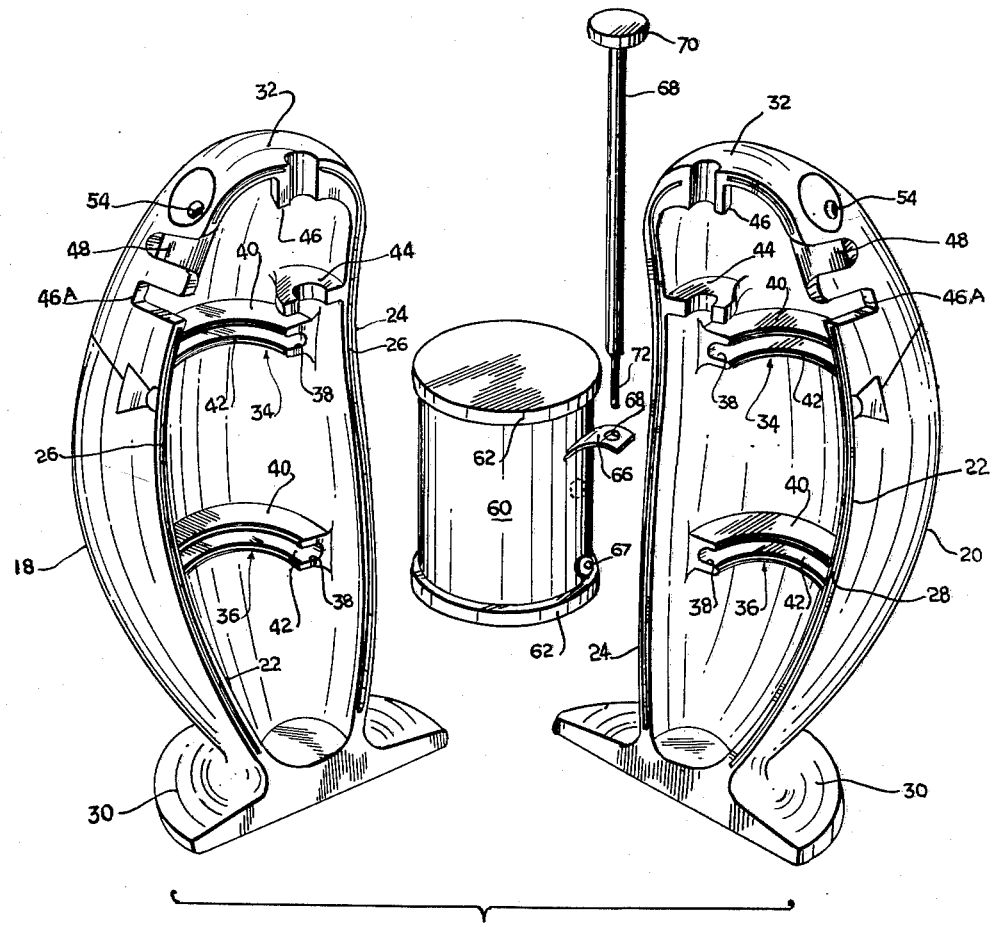
FIG. 4 is a spread perspective view of the candle extinguisher of FIG. 1, on an enlarged scale.
Figure 5:
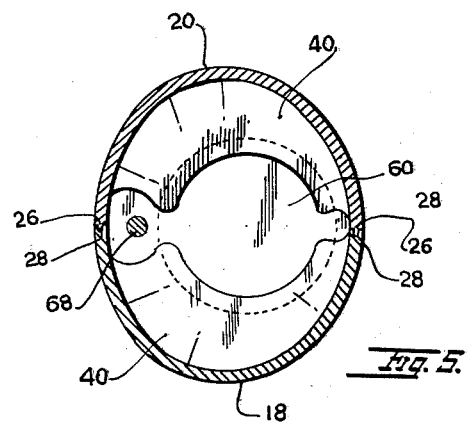
FIG. 5 is a cross-sectional view taken on the line 5—5 of FIG. 2.

Referring more in detail to the drawings, in FIG. 1 a candle extinguisher made in accordance with the invention is shown and designated generally by the reference numeral 10 and is illustrated as blowing out candles 12 on a birthday cake 14. The candle extinguisher 10 may be made of cardboard, wood, plastic or any other suitable material. It comprises an elongated bulbous sectional hollow body 16 shaped to simulate a bird or the like with a head simulating the head of a human being. The body comprises two separable hollow semicylindrical half shells 18 and 20. On opposing abutting long edges 22 and 24 of each of the shells 18 and 20, there are interlocking and interfitting ridges 26 and grooves 28, respectively. Each shell is formed at its bottom as viewed in FIGS. 1 and 2, with a semicircular flat base portion 30, and is formed at its top with a curved wall 32.

In each of the half shells there is an integral horizontally disposed upper bracket member 34 arcuate in shape above the midlength of the body, and a similar lower bracket member 36 below the midlength of the body. Each bracket member is grooved centrally as indicated at 38 providing upper and lower shelf members 40 and 42, respectively. Immediately above the upper bracket member 34 adjacent the long edge 24 there is an integral semiannular member 44, with the recess therein opening outwardly, the ends of the member having flat faces.

In direct vertical line above the semi-annular member 44 on wall 32, there is a depending semi-tubular member 46, the recess therein opening outwardly and being disposed in alignment with the recess in the semi-annular member 44. A transverse slot 46A, intersects the other long edge 22 approximately opposite the semi-annular member 44. Immediately above the slot 46A, there is a radial protuberance 48 semi-cylindrical in shape.

When the half shells 18 and 20 are pressed together in interlocking relation, the shells constitute a body in simulation of a bird or the like with the head of a human being. The joined slots simulate the mouth 50 and the joined protuberances simulate the nose 52 of a human being. Marks 54 on the outer surfaces of the shells simulate the eyes of a human being. At the place for the neckline, in the front of the body, there is a marking 56 in simulation of a necktie. Marks 58 on the sides of the body (only one mark being shown) simulate side wings of a bird.

In accordance with the invention, before the shells are assembled into the form of a body, a container of compressed air in the form of a cylindrical metal can 60 with annular beads 62 around the ends thereof is mounted inside the body, with the top bead 62 seated in the annular groove formed by the top bracket members 34 and with the bottom bead 62 seated in the annular groove formed by the lower bracket members 36. Can 60 is formed with a discharge opening 64 normally covered by a flexible metal strip 66 secured thereover by adhesive or the like and with a valve 67 for filling the can. The free end of the strip is normally looped over and the loop is formed with a hole 68. Means is provided for tearing the strip 66 off of the can to permit discharge of the air in the can into the interior of the body. This means comprises an elongated operating bar 68 having a head 70 at one end and a reduced portion 72 at its other end. The rod fits slidably in the entrance hole 74 formed by the recesses in the depending members 46 on walls 32 and in the guide hole formed by the recesses in the semi-annular members 44.

In operation, the candle extinguisher 10 is placed close to the birthday cake 14 on a supporting surface 76 with the mouth 50 of the body facing the cake and in line with the top of the candles 12 on the cake. The bottom end 72 of the actuating rod 68 is normally placed in the hole 68 in the strip and is interlocked with the strip. By pressing down on the head or button 70 of the rod 68, the strip 66 will be forcibly stripped off of the can exposing the discharge opening 64 in the can whereupon the air escapes into the interior of the body and out through the mouth 50 in the form of a blast thereby blowing out the candles 12 on the cake.

The cheapness of the material used and the inexpensiveness of the labor involved in assembling the extinguisher are such that the extinguisher may be discarded after a single use.

It shall be understood that the separable parts 18 and 20 are so constructed that after use of the candle extinguisher these parts are separable from one another and a new can 60 can replace the used can 60. While it is intended that the extinguisher be made of inexpensive material so as to permit a throw away of the entire device, it may be on occasions that a more permanent structure may be desired and the parts separated to receive a new can of compressed air. New cans can be readily provided for this purpose and the separable parts used again.

Other simulated human figures, dolls and the like may be used. The body of the device may take the form of other animals such as a bear, seal, elephant, etc. Various other simulated objects and decorative articles may be used to embody the invention.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United State Letters Patent is:

1. A candle extinguisher of the kind described comprising an elongated hollow bulbous body having a disc-shaped base for support on a horizontal supporting surface, the opposite end of the body being curved and having facial features simulating the face of a human being including a slot simulating a mouth, a can of compressed air inside the body, said can having a discharge opening, a removable strip normally closing said opening, said strip having a free end with a hole therein, and an elongated slidable rod inside the body with one end interlocked with the hole in said strip, the other end of the rod extending outwardly of the can and adapted to be pushed inwardly for stripping the closure strip off of the can to expose the opening whereby air escapes from the can out through the mouth of the body.

2. A candle extinguisher of the kind described comprising an elongated hollow bulbous body having facial features simulating the face of a human being including a slot simulating a mouth, a can of compressed air inside the body, said can having a discharge opening, a removable strip on the can normally closing said opening, said strip having a looped free end with a hole therein, and an elongated slidable rod inside the body with one end interlocked with the edge of the hole in the strip, the other end of the rod extending outwardly of the can and adapted to be pushed inwardly for stripping the closure strip off of the can to expose the opening therein whereby air escapes from the can out through the mouth of the body.

3. A candle extinguisher of the kind described comprising an elongated hollow bulbous body having facial features simulating the face of a human being including a slot simulating a mouth, a can of compressed air inside the body, said can having a discharge opening, a removable strip on the can normally closing said opening, said strip having a looped free end with a hole therein, and an elongated slidable rod inside the body with one end interlocked with the edge of the hole in the strip, the other end of the rod extending outwardly of the can and adapted to be pushed inwardly for stripping the closure strip off of the can to expose the opening therein whereby air escapes from the can out through the mouth of the body, and means for guiding the movement of said slidable rod.

4. A candle extinguisher of the kind described comprising an elongated hollow bulbous body having facial features simulating the face of a human being including a slot simulating a mouth, a can of compressed air inside the body, said can having a discharge opening, a removable strip on the can normally closing said opening, said strip having a looped free end with a hole therein, and an elongated slidable rod inside the body with one end interlocked with the edge of the hole in the strip, the other end of the rod extending outwardly of the can and adapted to be pushed inwardly for stripping the closure strip off of the can to expose the opening therein whereby air escapes from the can out through the mouth of the body, and means for guiding the movement of said slidable rod, said means including a hole in the top of the body, an annular member projecting laterally of the body on the inside thereof, the opening in said annular member being in line with the hole in the top of the body.

5. A candle extinguisher of the kind described comprising an elongated hollow bulbous sectional body having facial features on the outer surface thereof simulating the face of a human being including a slot simulating a mouth, upper and lower annular brackets on the inner surface of the body, a cylindrical can of compressed air supported by and between said brackets, said can having a discharge opening, a removable strip on the can normally closing said opening, said strip having a looped free end with a hole therein, and an elongated slidable rod inside the body and partly outside interlocked with the hole in the strip for stripping the closure strip off of the can to expose the discharge opening therein whereby air escapes from the can out through the mouth in the body.

6. A candle extinguisher of the kind described comprising an elongated hollow bulbous sectional body having facial features on the outer surface thereof simulating the face of a human being including a slot simulating a mouth, upper and lower annular brackets on the inner surface of the body, a cylindrical can of compressed air supported by and between said brackets, said can having a discharge opening, a removable strip on the can normally closing said opening, said strip having a looped free end with a hole therein, and an elongated slidable rod inside the body and partly outside interlocked with the hole in the strip for stripping the closure strip off of the can to expose the discharge opening therein whereby air escapes from the can out through the mouth in the body, and means for guiding the movement of said slidable rod.

7. A candle extinguisher of the kind described comprising an elongated hollow bulbous sectional body having facial features on the outer surface thereof simulating the face of a human being including a slot simulating a mouth, upper and lower annular brackets on the inner surface of the body, a cylindrical can of compressed air supported by and between said brackets, said can having a discharge opening, a removable strip on the can normally closing said opening, said strip having a looped free end with a hole therein, and an elongated slidable rod inside the body and partly outside interlocked with the hole in the strip for stripping the closure strip off of the can to expose the discharge opening therein whereby air escapes from the can out through the mouth in the body, and means for guiding the movement of said slidable rod, said means including a hole in the top of the body, an annular member projecting laterally of the body on the inside thereof, the opening in said annular member being in line with the hole in the top of the body.

References Cited by the Examiner
UNITED STATES PATENTS

| | | | |
|---|---|---|---|
| 1,524,802 | 2/25 | Slater | 239—211 |
| 1,625,449 | 4/27 | Bohn et al. | 264—250 |
| 1,694,959 | 12/8 | Ament | 239—211 |
| 1,763,115 | 6/30 | Wermine | 264—250 |
| 1,767,911 | 6/30 | Berko et al. | 239—211 |
| 2,957,468 | 10/60 | Enfield | 46—44 |
| 3,105,612 | 10/63 | Krasnoff et al. | 46—116 |
| 3,119,561 | 1/64 | Wilson | 239—309 |

FOREIGN PATENTS 1,168,772   9/58   France.

LOUIS J. DEMBO, *Primary Examiner.*

EVERETT W. KIRBY, *Examiner.*